(12) United States Patent
Roberge

(10) Patent No.: US 9,909,494 B2
(45) Date of Patent: Mar. 6, 2018

(54) TIP TURBINE ENGINE WITH ASPIRATED COMPRESSOR

(75) Inventor: Gary Roberge, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 3027 days.

(21) Appl. No.: 12/096,819

(22) PCT Filed: Feb. 15, 2006

(86) PCT No.: PCT/US2006/005403
§ 371 (c)(1),
(2), (4) Date: Sep. 8, 2008

(87) PCT Pub. No.: WO2007/106059
PCT Pub. Date: Sep. 20, 2007

(65) Prior Publication Data
US 2009/0019858 A1  Jan. 22, 2009

(51) Int. Cl.
*F02C 3/073* (2006.01)
(52) U.S. Cl.
CPC .................................. *F02C 3/073* (2013.01)
(58) Field of Classification Search
USPC .............. 60/269, 726, 785, 204, 226.1, 262; 415/1, 115, 144, 180, 186, 199.6; 416/232
See application file for complete search history.

(56) References Cited

U.S. PATENT DOCUMENTS

| | | | |
|---|---|---|---|
| 2,893,204 A * | 7/1959 | Anderson et al. | 60/39.183 |
| 3,283,509 A | 11/1966 | Nitsch | |
| 3,735,593 A | 5/1973 | Howell | |
| 4,783,026 A * | 11/1988 | Rumford et al. | 244/134 R |
| 4,863,348 A * | 9/1989 | Weinhold | 416/92 |
| 5,403,158 A * | 4/1995 | Auxier | 416/97 R |
| 6,004,095 A | 12/1999 | Waitz et al. | |
| 6,574,965 B1 * | 6/2003 | Feulner | 60/785 |
| 2004/0025490 A1 * | 2/2004 | Paul | 60/39.43 |
| 2005/0081530 A1 * | 4/2005 | Bagnall et al. | 60/785 |

OTHER PUBLICATIONS

International Search Report for PCT Application No. PCT/US06/05403, dated May 6, 2008.

* cited by examiner

*Primary Examiner* — Steven Sutherland
(74) *Attorney, Agent, or Firm* — Carlson, Gaskey & Olds, P.C.

(57) ABSTRACT

A tip turbine engine includes an axial compressor having a plurality of airfoils compressing core airflow. The airfoils include bleed air openings on their suction side surfaces. The bleed air openings prevent separation of the compressed airflow, which permits each airfoil stage to perform increased compression without separation of the airflow. As a result, the number of stages can be reduced, thereby shortening the overall length of the turbine engine.

15 Claims, 2 Drawing Sheets

TIP TURBINE ENGINE WITH ASPIRATED COMPRESSOR

BACKGROUND OF THE INVENTION

The present invention relates to a turbine engine, and more particularly to an improved compressor for a tip turbine engine.

An aircraft gas turbine engine of the conventional turbofan type generally includes a forward bypass fan and a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

Although much shorter axially than conventional turbine engines, much of the length of the tip turbine engine results from the number of stages in the axial compressor. Reducing the number of compressor stages would further decrease the axial length of the tip turbine engine.

The number of stages could be reduced by using larger chord compressor blades that do more work in turning and compressing the air. However, at some point, the compressor blade tends to separate from the blade and the blade becomes highly inefficient, and can result in engine stall.

Aspirated compressors have been used in conventional turbine engines to reduce the number of stages required in the compressor. In an aspirated compressor, suction is provided at selected locations on the surface of the compressor blades. The suction keeps the flow attached to the blade even with increased curvature and longer blade chord lengths. Aspirated compressors have not been implemented in tip turbine engines, which already have a shorter axial dimension.

SUMMARY OF THE INVENTION

The present invention provides a tip turbine engine including an axial compressor having a plurality of airfoils compressing core airflow. The airfoils include bleed air openings on their suction side surfaces. The bleed air openings prevent separation of the compressed airflow, which permits each airfoil stage to perform increased compression without separation of the airflow. As a result, the number of stages can be reduced, thereby shortening the overall length of the turbine engine.

In the example shown, the bleed air openings of the compressor blades are connected to a low pressure area radially outward of the combustor, which also provides a cool layer of air between the combustor and the adjacent airframe structure. The bleed air openings of the compressor vanes are connected to a low pressure area in an air-oil heat exchanger for cooling lubrication for a gearbox in the turbine engine.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
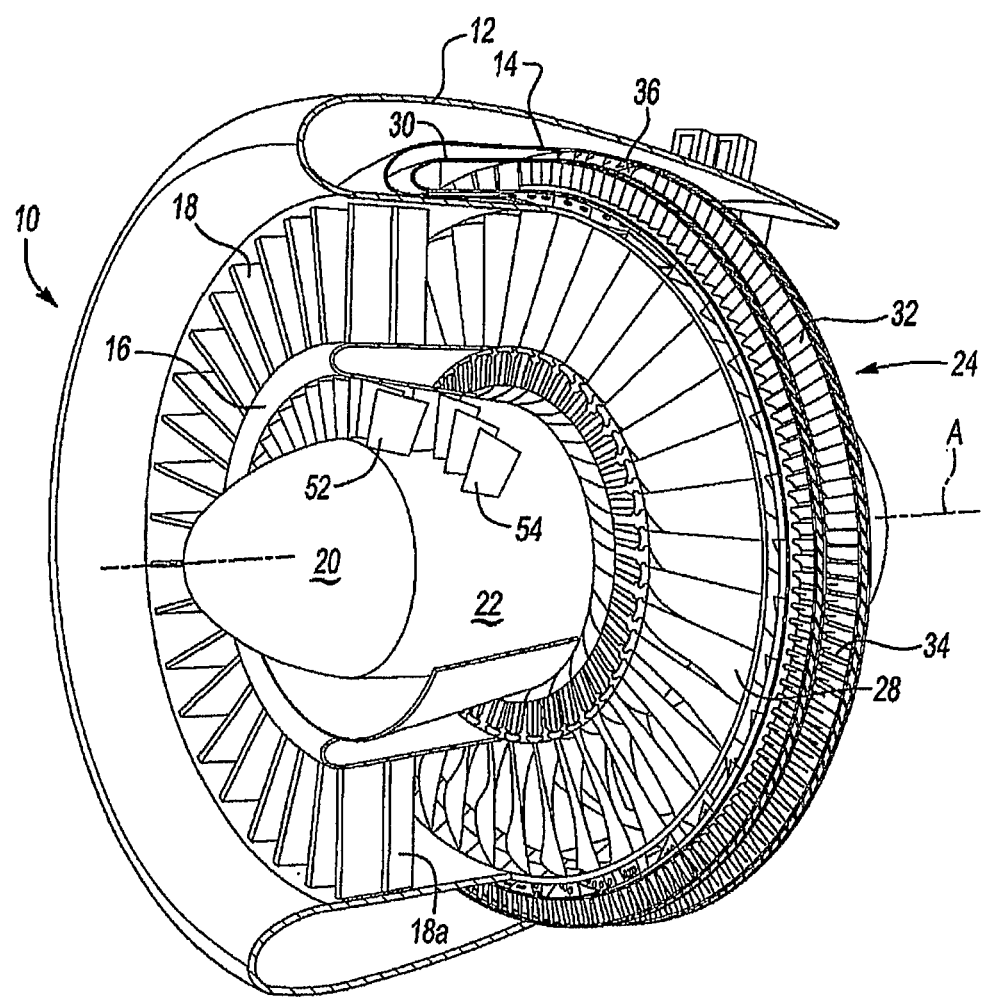
FIG. 1 is a partial sectional perspective view of a tip turbine engine according to the present invention.

FIG. 1 illustrates a general perspective partial sectional view of a tip turbine engine type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18A.

A nosecone 20 is preferably located along the engine centerline A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine vanes 36 which extend radially inwardly from the rotationally fixed static outer support structure 14. The annular combustor 30 is disposed axially forward of the turbine 32 and communicates with the turbine 32.

Figure 2:
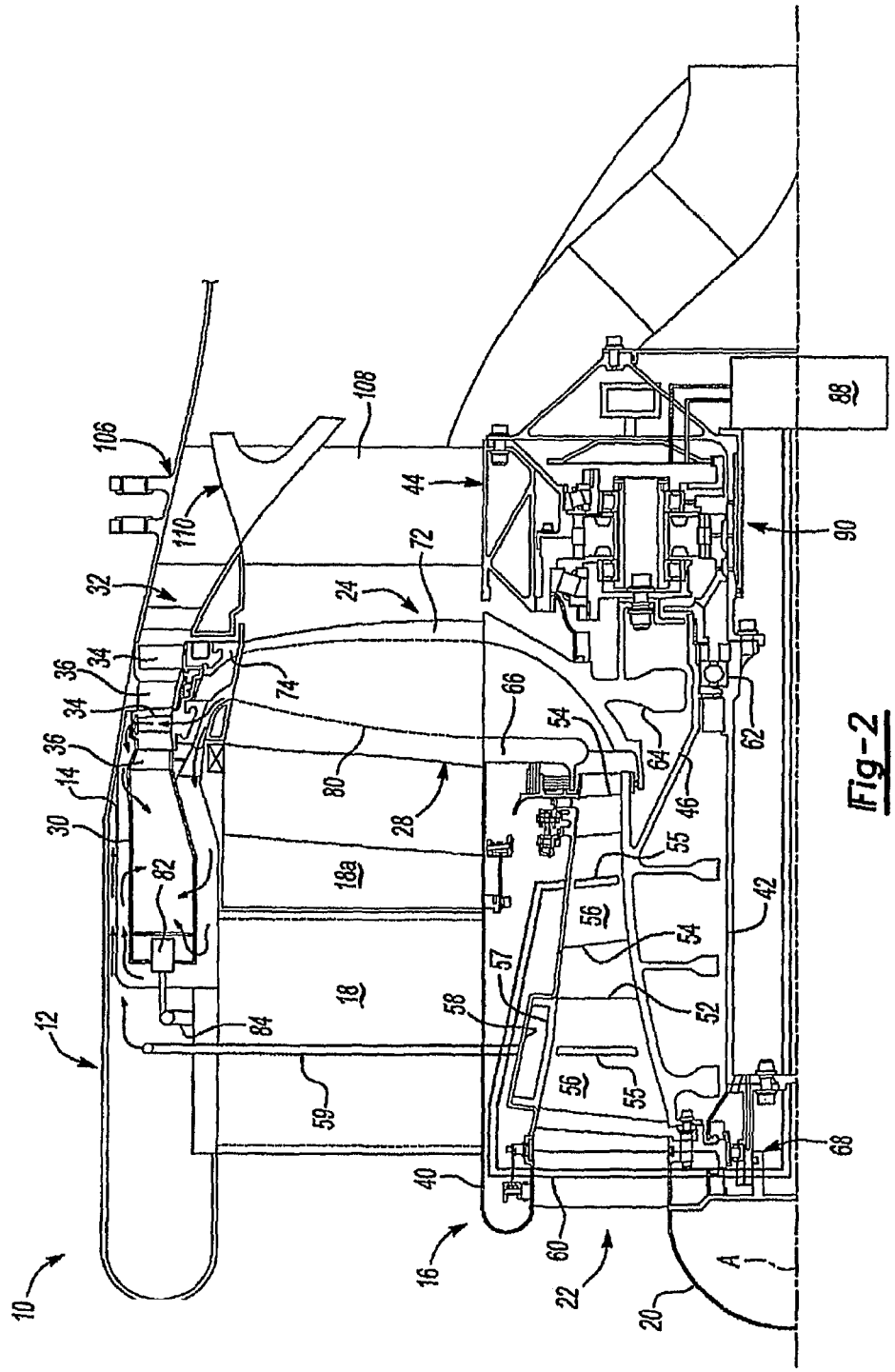
FIG. 2 is a partial longitudinal sectional view of the tip turbine engine of FIG. 1 taken along an engine centerline.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, from which a plurality of compressor blades 52 extend radially outwardly, and a fixed compressor case 50. A plurality of compressor vanes 54 extend radially inwardly from the compressor case 50 aft of the compressor blades 52. The axial compressor rotor 46 is mounted for rotation upon the static inner support housing 42 through a forward bearing assembly 68 and an aft bearing assembly 62. Although in the embodiment shown only a single stage of compressor blades 52 and a single stage of compressor vanes 54 are necessary, a plurality of stages of compressor blades 52 and compressor vanes 54 may be provided; however, overall, the number of stages of compressor blades 52 and/or compressor vanes 54 can be reduced with the present invention.

The compressor blades 52 and the compressor vanes 54 are larger and provide more turning than previous designs, such that sufficient compression is provided in the single stage. In order to prevent separation, each of the compressor blades 52 and each of the compressor vanes 54 include at least one bleed opening 55 on its suction surface 56. The bleed opening 55 may be a slot, as shown, or a plurality of holes. The bleed opening 55 on the compressor blade 52 leads through the interior of the compressor blade 52 to an aperture 57 at the tip of the compressor blade 52. The tip of the compressor blade 52 is positioned adjacent an annular bleed chamber 58. One or more conduits 59 lead from the annular bleed chamber 58 to a low-pressure area, which in the example shown is the region between the hot combustion chamber 30 and the adjacent airframe structure. One or more conduits 60 lead from the bleed openings 55 on the compressor vanes 54 to another low-pressure area, which in the example shown is an air-oil heat exchanger 88 for cooling the lubrication system of the gearbox 90.

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 which acts as a compressor chamber where the airflow is centrifugally compressed. From the core airflow passage 80, the airflow is diffused and turned once again by the diffuser section 74 toward the annular combustor 30.

Generally, the airflow through the core airflow passage 80 is core airflow directed by the diffuser section 74 axially forward toward the combustor 30. Minimal amounts of airflow may be directed radially outwardly from the diffuser section 74 through the tip turbine blades 34 (paths not shown) to cool the tip turbine blades 34. This cooling airflow is then discharged through radially outer ends of the tip turbine blades 34 and then into the combustor 30. However, at least substantially all of the airflow is core airflow directed by the diffuser section 74 toward the combustor 30. As used herein, "core airflow" is airflow that flows to the combustor 30.

A plurality of fuel injectors 82, or "nozzles," (one shown) supply fuel to the combustor 30. Fuel is delivered to the fuel injectors 82 from a fuel manifold or ring 84 extending circumferentially about the engine centerline A.

A gearbox assembly 90 aft of the fan-turbine rotor assembly 24 provides a speed increase between the fan-turbine rotor assembly 24 and the axial compressor 22.

In operation, referring to FIG. 2, air enters the axial compressor 22, where it is compressed by the compressor blades 52 and compressor vanes 54. Suction from the low-pressure areas is provided through the bleed openings 55 on the suction side surfaces 56 of the compressor blades 52 and the compressor vanes 54 via the conduits 59, 60. The suction provided on the suction side surfaces 56 prevents a separation of the airflow from the airfoils (compressor blades 52 and compressor vanes 54) that would otherwise occur due to the large amount of turning and compression provided by the compressor blades 52 and compressor vanes 54.

The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 by diffuser section 74 into the annular combustor 30. The compressed core airflow from the hollow fan blades 28 then flows radially outwardly and through the annular inner and outer combustion chamber walls 114, 116 and the bulkhead 118 to the combustion chamber 112. The fuel is injected into the annular combustor 30 where it is mixed with the core airflow and ignited to form a high-energy gas stream.

The high-energy gas stream expands through the turbine vanes 36 and the tip turbine blades 34. The high-energy gas stream rotatably drives the plurality of tip turbine blades 34 mounted about the outer periphery of the fan-turbine rotor assembly 24 to drive the fan-turbine rotor assembly 24, which in turn drives the axial compressor 22 via the gearbox assembly 90.

The fan-turbine rotor assembly 24 discharges fan bypass air axially aft to merge with the core airflow from the turbine 32 in an exhaust case 106. A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the tip turbine blades 34 with the bypass airflow through the fan blades 28.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, although the invention is shown as used in a tip turbine engine, the present invention would be beneficial in most or all conventional gas turbine engines.

The invention claimed is:

1. A turbine engine comprising:
a fan including a plurality of fan blades, at least one of the fan blades having a centrifugal compression chamber defined therein;
an axial compressor including a plurality of compressor blades and compressor vanes, a core airflow path defined through the axial compressor and through the centrifugal compression chamber, at least one of the compressor blades and compressor vanes having a suction surface with an opening therein leading to an interior thereof;
a passageway connecting the interior of the at least one of the compressor blades and compressor vanes to at least one low pressure area of the turbine engine;
further including a combustor radially outward of the plurality of fan blades, the core airflow path leading through the centrifugal compression chamber to the combustor; and
the at least one low pressure area is radially outward of the combustor.

2. The turbine engine of claim 1 wherein the at least one of the compressor blades and compressor vanes is at least one of the compressor blades.

3. The turbine engine of claim 1 wherein the at least one low pressure area is a heat exchanger.

4. The turbine engine of claim 1 wherein the at least one of the compressor blades and compressor vanes is the plurality of compressor blades and the plurality of compressor vanes.

5. The turbine engine of claim 4 wherein the at least one low pressure area includes a heat exchanger.

6. The turbine engine of claim 1, wherein the at least one of the compressor blades and compressor vanes is both at least one of the compressor blades and at least one of the compressor vanes.

7. The turbine engine of claim 6, wherein a first passageway connects to the interior of the at least one compressor blade and a second passageway connects to the interior of the at least one compressor vane.

8. The turbine engine of claim 7, wherein the first passageway and second passageway each lead to at least one low pressure area.

9. The turbine engine of claim 8, wherein the first passageway leads to a first low pressure area and the second passageway leads to a second low pressure area in a different location than the first low pressure area.

10. The turbine engine of claim 4, wherein the at least one low pressure area is axially aft of an inlet to the axial compressor.

11. A method for operating a turbine engine combustor including the steps of:
    a) compressing core airflow with a rotating airfoil having a suction side;
    b) bleeding air from the suction side of the airfoil to prevent separation;
    c) directing the compressed core airflow through an interior of a rotating fan blade; and
    d) directing the compressed core airflow from the fan blade into a combustor.

12. The method of claim 11 further including the step of directing the bleed air from the suction side of the airfoil to a low pressure area of the turbine engine.

13. The method of claim 12 wherein the low pressure area is radially outward of the fan blade.

14. The method of claim 12 wherein the low pressure area is a heat exchanger for cooling a lubrication system for a gear system.

15. The method of claim 11, wherein step (b) includes bleeding air from the suction side of the airfoil to prevent separation through a plurality of holes.

* * * * *